United States Patent
Duffy et al.

[11] 3,924,020
[45] Dec. 2, 1975

[54] METHOD OF MAKING AN OPTICAL WAVEGUIDE

[75] Inventor: Michael Thomas Duffy, Princeton Junction; Donald Jones Channin, East Windsor; Jacob Meyer Hammer, Trenton, all of New Jersey

[73] Assignee: RCA Corporation, New York, N.Y.

[22] Filed: Dec. 13, 1973

[21] Appl. No.: 424,318

[52] U.S. Cl. ... 427/162, 427/124, 250; 350/96 WG
[51] Int. Cl.² .............................. C23C 13/02
[58] Field of Search ... 106/42, 65; 117/107.22, 117/129, 131, 200, 201, 211, 215, 217, 227; 161/196, 206; 350/96 WG; 427/124, 162, 250

[56] References Cited
OTHER PUBLICATIONS

Tien, et al., Two-layered construction of integrated optical circuits and formation of thin-film prisms, lenses, and reflectors, in applied physics letters, Vol. 24, No. 11, June 1974.

Hammer, et al., Fast Electro-optic Waveguide Deflector Modulator, in Applied Physics Letters, Vol. 23, No. 4, August 15, 1973.
Blodm, et al., Optical-waveguides formation by Ion Implantation and by Sputtering. In Opital Society of America, April 1974
Dakss, et al., Single Crystal Films of ZnO. In IBM Technical Disclosure Bulletin, Vol. 13, No. 5, October 1970.

*Primary Examiner*—Cameron K. Weiffenbach
*Assistant Examiner*—R. E. Varndell, Jr.
*Attorney, Agent, or Firm*—H. Christoffersen

[57] ABSTRACT

An optical waveguide, comprising a polished layer of epitaxially deposited zinc oxide on a substrate of sapphire, and possessing the characteristics of a high stable resistivity and a low-loss optical transmission is made by (1) diffusing lithium into the zinc oxide layer in an oxygen ambient at a temperature of between 600°C and 800°C for between about one and five hours, (2) applying a passivating film of aluminum oxide over the zinc oxide, and (3) depositing electrodes on the passivating film.

11 Claims, 2 Drawing Figures

U.S. Patent Dec. 2, 1975 Sheet 1 of 2 3,924,020
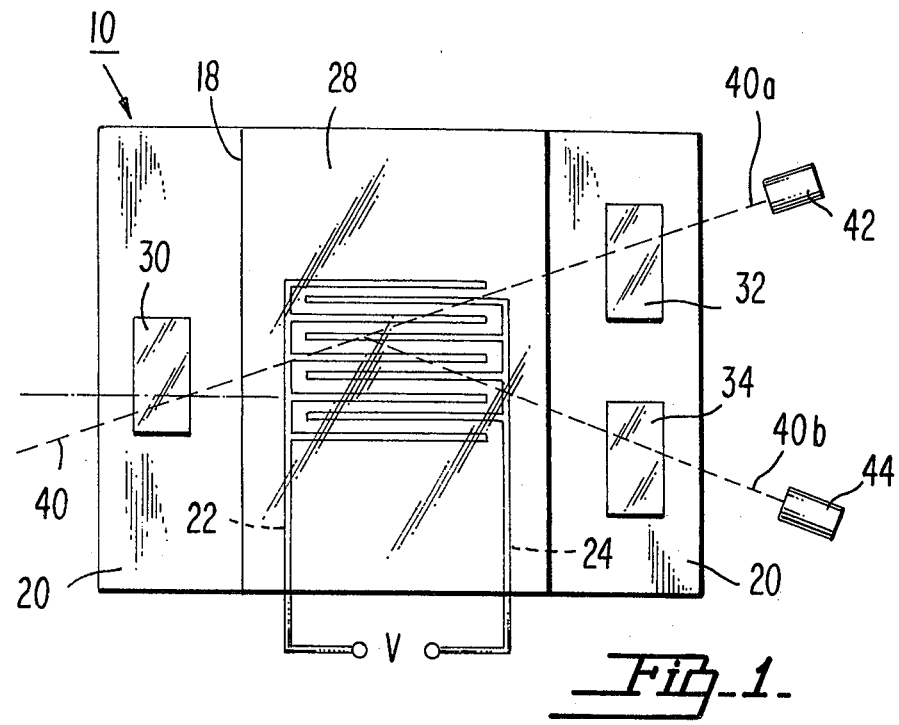
Fig. 1.
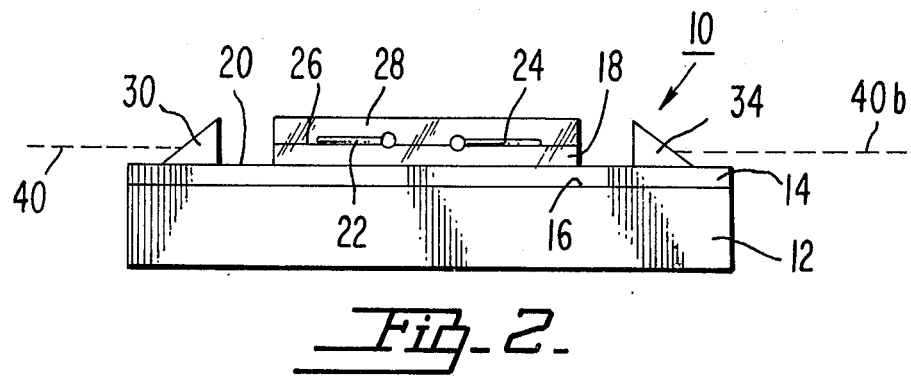
Fig. 2.
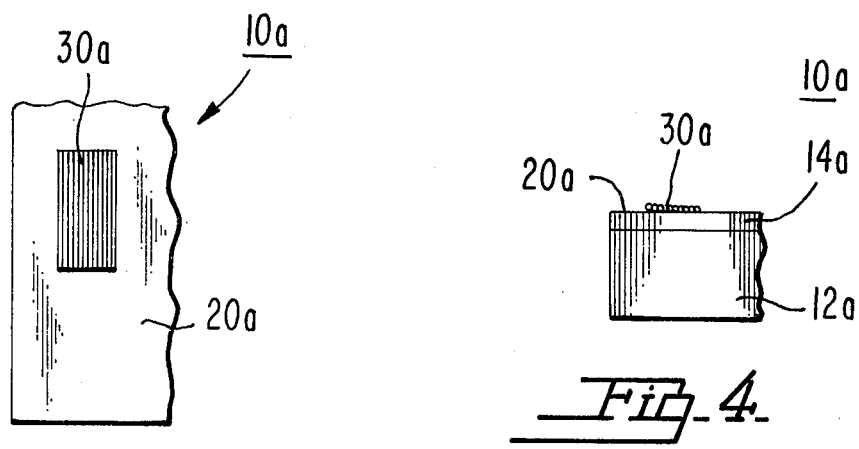
Fig. 3.
Fig. 4.

METHOD OF MAKING AN OPTICAL WAVEGUIDE

The invention herein described was made in the course of or under a contract or subcontract thereunder with the United States Air Force.

BACKGROUND OF THE INVENTION

Field of Invention

This invention relates to optical waveguides, and more particularly to a method of making high stable resistivity, low-loss transmission, zinc oxide optical waveguides. The novel optical waveguides of the present invention are particularly useful for performing operations of switching, modulating, and deflecting coherent light.

Description of Prior Art

Prior-art zinc oxide optical waveguides have been made by sputtering a layer of zinc oxide onto an insulating substrate as reported in an article "Light Waves in Thin Films and Integrated Optics" by P. K. Tien in Applied Optics, Vol. 10, p. 2395, 1971. These prior-art optical waveguides, however, were relatively inefficient because they presented a relatively high loss to the transmission of coherent light therethrough, and because the resistivity of the zinc oxide layer would vary with the ambient temperature and humidity. Also, metal electrodes deposited directly on the zinc oxide layer of the prior-art optical waveguide would cause coherent light in the zinc oxide layer to be scattered, resulting in a relatively high loss in the optical transmission of the light. The novel waveguide, made in accordance with the present invention, is relatively more efficient than the prior-art, zinc oxide, optical waveguides in that it has a high resistivity of greater stability and presents a lower loss to the optical transmission of coherent light.

SUMMARY OF THE INVENTION

Briefly stated, the novel method of making an optical waveguide, in one embodiment, comprises depositing a layer of single-crystal zinc oxide epitaxially on a flat surface of a substrate of sapphire. Next, the zinc oxide layer is polished and then compensated and annealed by diffusing lithium into the zinc oxide layer in an oxygen ambient, at a temperature of between about 600°C and 800°C for between about one and five hours. A passivating film of aluminum oxide is applied over the zinc oxide layer.

In another embodiment of the novel method, the zinc oxide layer is annealed in oxygen at a temperature of between about 800°C and 1000°C for about one hour prior to the step of diffusing the lithium into the zinc oxide layer. A pair of electrodes is deposited over the passivating film and a second film of aluminum oxide is deposited over the electrodes and the passivating film.

The novel waveguide derives its practicality from the novel method of making it.

BRIEF DESCRIPTION OF THE DRAWINGS

The novel optical waveguide and the method of making it will be described in conjunction with the accompanying drawings in which:

FIG. 1 is a plan view, partially schematic, of one embodiment of the novel optical waveguide;

FIG. 2 is a front elevational view of the optical waveguide shown in FIG. 1;

FIG. 3 is a fragmentary plan view of a portion of another embodiment of the novel optical waveguide, showing optical input means;

FIG. 4 is a fragmentary front elevational view of the optical input means shown in FIG. 3;

DESCRIPTION OF THE PREFERRED EMBODIMENTS

Figure 5:
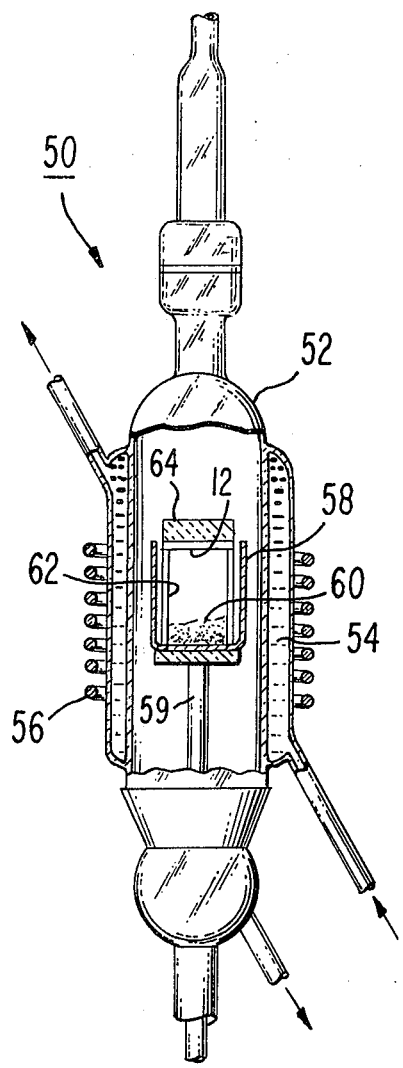
FIG. 5 is a schematic drawing of apparatus for depositing zinc oxide epitaxially on a substrate.

Referring now to FIGS. 1 and 2 of the drawing, there is shown an optical waveguide 10, in accordance with one embodiment of the invention. The waveguide 10 comprises a substrate 12 of sapphire ($Al_2O_3$) and a layer 14 of single-crystal zinc oxide (ZnO) epitaxially deposited on an upper flat surface 16 of the substrate 12. A passivating film 18 of aluminum oxide ($Al_2O_3$) is deposited on an upper smooth surface 20 of the zinc oxide layer 14, and a pair of interdigitated electrodes 22 and 24 are deposited on the upper surface 26 of the passivating film 18. While only one pair of electrodes 22 and 24 is shown, it is within the contemplation of the present invention to have as many pairs of electrodes as desired. A second film 28 of aluminum oxide is deposited over the electrodes 22 and 24 and the passivating film 18 for the purpose hereinafter appearing.

Optical input means to the waveguide 10 comprise one or more optical prisms adjacent one side of the electrodes 22 and 24, only one input prism 30 being shown in the drawing. The input prism 30 is disposed on the upper surface 20 of the zinc oxide layer 14. Optical output means comprise a plurality of output prisms disposed on the upper surface 20 of the zinc oxide layer 14 adjacent an opposite side of the electrodes 22 and 24. Two output prisms 32 and 34 are shown in FIG. 1.

Referring now to FIGS. 3 and 4 of the drawing, there is shown a portion of a waveguide 10a, substantially similar to the waveguide 10, having a substrate 12a of sapphire and an epitaxially deposited zinc oxide layer 14a on the substrate 12a. The optical input means, however, in FIGS. 3 and 4, is a holographic input diffraction grating 30a that is formed by holographically exposing suitable photosensitive films deposited on the upper surface 20a of the zinc oxide layer 14a. The input diffraction grating 30a is disposed on the upper surface 20a of the zinc oxide layer 14a. Output optical means of the waveguide 10a, shown in FIGS. 3 and 4, can also be output diffraction gratings (not shown), similar to the diffraction grating 30a and positioned on the surface 20a in place of the prisms 32 and 34 shown in FIG 1.

In operation, a coherent beam 40 of light, such as a laser beam, introduced into the input prism 30 enters the zinc oxide layer 14. A portion of the beam 40 can be deflected by a voltage V, such as a square-wave pulse of between 10 and 120 volts, for example, applied between the interdigitated electrodes 22 and 24 because the applied voltage changes the index of refraction of the zinc oxide layer 14, thereby deflecting a portion of the beam 40 of light. Thus, looking at FIG. 1, when the beam 40 of coherent light is introduced into the input prism 30, one portion 40a of the beam 40 travels in the original direction, emerging through the output prism 32; and another portion 40b of the beam 40 travels at an angle to the original direction, emerging through the output prism 34. The output portions 40a and 40b of the beam 40 of coherent light can be detected by photomultipliers 42 and 44, respectfully, for further utilization, as for example, for conversion into electrical signals for further transmission.

In order for the waveguide 10 to operate efficiently, its composite material requirements should be such as to provide a sufficient refractive index difference to insure good waveguiding characteristics. The electro-optic and/or piezoelectric effects must also be well defined and sufficiently strong to make the waveguide 10 practical. Also, the materials of the waveguide 10 must be sufficiently stable to permit its mass fabrication.

The novel waveguide 10 is rendered practical and efficient because of the novel method of making it. In accordance with the novel method, hereinafter to be described, there is provided the novel waveguide 10 with a low-loss optical transmission path through a single-crystal zinc oxide layer of sufficiently high resistivity and stability to provide good waveguiding characteristics with relatively low scattering and absorption losses. The reason for the high resistivity is to permit the electric fields produced by a voltage applied to the electrodes to enter the waveguide and to induce the desired electro-optic and/or piezoelectric effects.

The nature of the surface 16 of the sapphire substrate 12 has a strong influence on the zinc oxide layer 14 deposited upon it. In general, ordinary substrate cleaning processes, based upon the use of common solvents, are insufficient and may result in the deposition of polycrystalline films of the zinc oxide layer. These problems are overcome be etching the surface 16 of the substrate 12 in 85% phosphoric acid ($H_3PO_4$) at a temperature of 280°C. This treatment provides a suitable surface 16 for heteroepitaxy in substantially all cases. The etching process, however, may accentuate polishing scratch marks on the sapphire surface 16 which are not apparent initially. Because of the possible light-scattering influence of these defects on optical waveguiding, the sapphire substrate 12 is annealed in air at about 1500°C for between one and five hours prior to the aforementioned etching. This procedure results in a reduced density of surface defects after etching.

The zinc oxide layer 14 is grown epitaxially in single-crystal form on the surface 16 of the substrate 12 by a close-space chemical vapor transport operation, using zinc oxide powder as a source material. The transporting agent is hydrogen ($H_2$) and the epitaxial composites are defined by the following orientation relationships:

($1\bar{1}20$) ZnO//($01\bar{1}2$) $Al_2O_3$; [$1\bar{1}00$] ZnO//[$2\bar{1}\bar{1}0$] $Al_2O_3$. These relationships indicate that the ($1\bar{1}20$) plane of zinc oxide is substantially parallel to the ($01\bar{1}2$) plane of aluminum oxide; and the [$1\bar{1}00$] direction of zinc oxide is substantially parallel to the [$2\bar{1}\bar{1}0$] direction of the aluminum oxide. The zinc oxide layer 14 is deposited to a thickness controlled to within a range of between about 3,000Å and 20,000Å.

A schematic diagram of apparatus 50 for depositing the epitaxial zinc oxide layer 14 is shown in FIG. 5. The apparatus 50 comprises a reaction tube or vessel 52 of quartz surrounded by a water jacket 54 and a radio-frequency (rf) heating coil 56. The substrate 12 of sapphire is suspended in an inverted position over a vitreous carbon crucible 58 containing zinc oxide powder 60 which is heated by rf induction via coil 56. The crucible 58 is supported by a suitable pedestal 59 that can be rotated by any suitable means (not shown). The temperature of crucible 58 is maintained at about 850°C and that of the substrate 12 about 50°C to 100°C lower. The substrate is suspended within the upper walls of the crucible 58, as by a quartz (spacer) tube 62, and is heated by convention currents and radiation within the crucible 58. In addition, the temperature differential (50°C to 100°C) between the zinc oxide powder 60 and the sapphire substrate 12 is also obtained by disposing the top of the crucible 58 above the top of the induction heating coil 56, as shown in FIG. 5. A graphite block 64 placed over the substrate 12 helps to maintain a uniform temperature of the substrate 12. The ambient is a flow of hydrogen ($H_2$) through the vertical reaction vessel 52. The flow rate is not critical. With this arrangement and with the above-mentioned orientation of the sapphire substrate 12, the epitaxial zinc oxide layer 14 is deposited so that its C-axis lies in the plane of the layer 14. A preferred growth rate of about one micrometer per minute produces a relatively smooth layer 14 of semiconducting n-type zinc oxide with a resistivity of about 1.0 ohm cm.

Even the smoothest zinc oxide layer 14 deposited with the apparatus 50 has surface faceting and a topography that is too course for low-loss optical waveguiding and device fabrication. Hence, the surface 20 of the zinc oxide layer 14 is polished with a suitable polishing agent until preferably no scratch lines or surface faceting are visible observable with a 1000X magnification. Suitable polishing agents are "Syton" (Monsanto, St. Louis, Mo.) a suspension of colloidal silica (0.1 micrometer particle size) in an alkaline solution or "Linde B" (Gamma $Al_2O_3$, 0.05 micrometer particle size, Union Carbide, San Diego, Cal.). The surface 20 of the zinc oxide layer is successively polished, for example, with various grades of the "Linde" ($Al_2O_3$) in order of decreasing particle size (1.0μm, 0.3μm, and 0.05μm). A slurry of chromium oxide ($Cr_2O_3$) can be used as a final polishing agent. The "Syton" and "Linde" polishing agents are applied in a slurry on a rotary pad.

After polishing the surface 20 of the zinc oxide layer 14, an important step in making low-loss zinc oxide optical waveguides in a reproducible manner is the thermal annealing of the zinc oxide layer 14 in an oxygen ambient at a temperature range of between about 800°C and 1000°C, preferably about 850°C, for about one hour. Zinc oxide layers which exhibited waveguiding losses of up to about 70 dB/cm prior to this annealing step showed losses of about 1 dB/cm after annealing in oxygen at 850°C for one hour. Our observations indicate that annealing in oxygen is an essential step to producing useful, efficient, and practical zinc oxide optical waveguides.

After annealing, the zinc oxide layer 14 is compensated by diffusing lithium into it, in the presence of oxygen, to obtain a high resistivity (at least $10^5$ ohm cm) suitable for an electrically operated optical waveguide. This is accomplished with the aid of apparatus 70 (FIG. 6), substantially similar to the apparatus 50 of FIG. 5, wherein reference numerals similar to those in apparatus 50 indicate similar parts. A lithium source 72, derived from lithium hydroxide (LiOH), is placed on a silicon carbide coated graphite susceptor 61 on the pedestal 59. The LiOH is heated until molten at about 450°C. The molten liquid is spread uniformly over the heated susceptor 61 and then heated further to a temperature of about 600°C until dehydration is completed and a white powder remains. Next, the temperature of the white powder is raised to about 1100°C for approximately fifteen minutes and then cooled to room temperature. The zinc oxide layer 14 is disposed, facing the white powder lithium source 72 on a quartz spacer 74 of about 5 millimeters in height and the susceptor 61 is heated by rf induction to a temperature of about 850°C. Under these conditions, the zinc oxide layer 14 is indirectly heated to a temperature of between about 600°C and 800°C.

Figure 6:
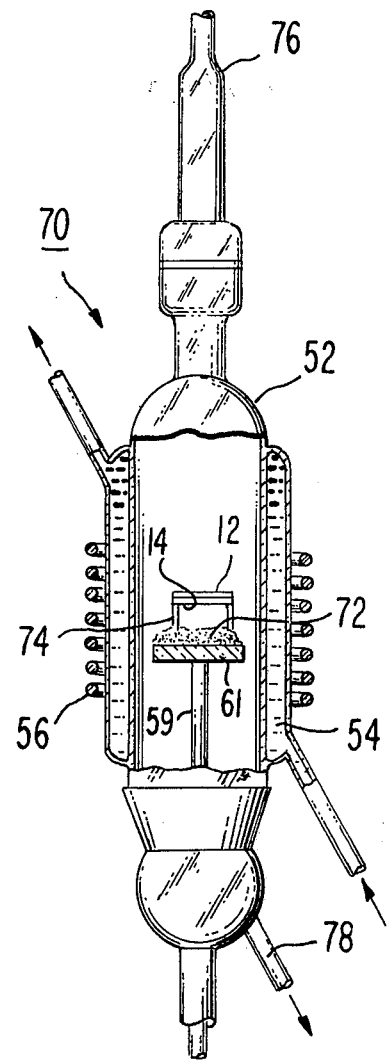
FIG. 6 is a schematic drawing of apparatus for compensating the zinc oxide layer with lithium and for annealing the compensated layer.

The heating (annealing) of the zinc oxide layer 14 within the reaction vessel 52 of FIG. 6 is done in an ambient of oxygen, the oxygen being passed through the reaction vessel 52 in a direction from an upper entrance port 76 to a lower exhaust port 78. The compensation of the zinc oxide layer 14 with lithium within the apparatus 70 is carried out for a period of between one and five hours, and this operation is also in the nature of an annealing operation. The compensation of the zinc oxide layer 14 with lithium, as carried out with the apparatus 70, differs from a prior-art method wherein a lithium compound was painted on the zinc oxide layer surface and then heated. In the prior-art compensation operation the surface of the zinc oxide layer was chemically attacked and etched because of the corrosive nature of the lithium source. By using the apparatus 70, the zinc oxide layer is compensated at a faster rate and is free of chemical attack in comparison to the prior-art method.

The annealing step following the polishing of the surface 20 of the zinc oxide layer 14 may be eliminated if the zinc oxide layer 14 is heated between 600°C and 800°C for a period of between one and five hours during the aforementioned compensation operation with lithium. After compensation, the zinc oxide layer 14 has a resistivity of at least $10^5$ ohm cm.

The surface resistivity of the compensated zinc oxide layer 14, if left unprotected, tends to change to lower values when exposed to the room ambient for a few days, diminishing its potential as an optical waveguide in integrated optics. A high resistivity (at least $10^5$ ohm cm) can be restored to the zinc oxide layer 14 by subsequently annealing it in oxygen at about 850°C for about one hour. It is, therefore, important to passivate the zinc oxide layer 14 immediately after its compensation (and annealing) operation. The zinc oxide layer 14 is passivated by depositing on its surface 20 a thin overlay layer or film 18 (FIG. 2) of aluminum oxide ($Al_2O_3$), as by the pyrolysis of aluminum isopropoxide. The passivating film 18 is deposited to a thickness of between about 500Å and 2000Å. Such a process is carried out by the chemical vapor deposition of aluminum oxide (by the pyrolysis of the aluminum isopropoxide) in a manner known in the art. The passivating film 18 protects the surface 20, over which it is disposed, from the ambient and enables the zinc oxide layer 14 to exhibit a high resistivity for relatively long periods of time. If the compensated zinc oxide layer 14 should show a reduced surface resistivity, even after the passivating film 18 has been deposited thereon, the high resistivity can be restored by annealing the passivated waveguide in oxygen at about 850°C for about one hour. The restoration of the high resistivity of the zinc oxide layer 14 cannot be accomplished in air or in an inert ambient. It is crucial that the annealing process be carried out in oxygen. Air, and especially nitrogen, cannot be used for an annealing ambient here because nitrogen appears to be detrimental to the annealing process, decreasing the resistivity of the zinc oxide layer 14.

The interdigitated electrodes 22 and 24 are deposited on the upper surface 26 of the passivating film 18 by photolithographic processing well known in the art. The interdigitated electrodes 22 and 24 can be of any suitable metals, as, for example, a composite of layers of chromium and gold. A second film 28 of aluminum oxide, similar to the passivating film 18, is deposited over the upper surface 26 of the passivating film 18 and over the interdigitated electrodes 22 and 24. The second film 28 of aluminum oxide provides a high dielectric material between the interdigitated electrodes 22 and 24 and tends to prevent electrical arcing therebetween. The film 28 also tends to confine the electric field between the interdigitated electrodes 22 and 24, when a voltage is applied therebetween, and to direct the electric field toward the zinc oxide layer 14 to change the latter's refractive index, whereby the layer 14 can function as an optical deflector and modulator.

We claim:
1. A method of making an optical waveguide comprising the steps of:
    depositing a layer of single-crystal ZnO epitaxially on a flat surface of a substrate of sapphire,
    polishing a surface of said ZnO layer,
    providing a vapor source of lithium by melting lithium hydroxide at about 450°C, dehydrating the molten lithium hydroxide at about 600°C to form a white powder, and heating the white powder to about 1100°C for about fifteen minutes,
    diffusing lithium from said vapor source into said ZnO layer in an oxygen ambient by heating said white powder adjacent said ZnO layer to a temperature of about 850°C while maintaining said ZnO layer at a temperature of between about 600°C and 800°C for between about one and five hours, and
    applying a passivating film of aluminum oxide over said ZnO layer.
2. A method of making an optical waveguide as de- scribed in claim 1 comprising the additional step of:
annealing said substrate and said ZnO layer in an oxygen ambient at a temperature of between about 800°C and 1000°C for about one hour prior to the step of diffusing lithium into said ZnO layer.

3. A method of making an optical waveguide as described in claim 1 wherein:
said layer of ZnO is deposited epitaxially on said flat surface of said substrate at a rate of about one micrometer per minute to a thickness of between about 3000Å and 20,000Å.

4. A method of making an optical waveguide as described in claim 1 wherein:
said layer of ZnO is deposited to a thickness of between about 3000Å and 20,000Å, and
said layer of aluminum oxide is deposited to a thickness of between about 500Å and 2,000Å.

5. A method of making an optical waveguide as described in claim 1 wherein:
said lithium is diffused into said ZnO layer until said layer has a resistivity of at least $10^5$ ohm cm.

6. A method of making an optical waveguide as described in claim 1 wherein:
the step of applying a passivating layer of aluminum oxide over said ZnO layer is performed immediately after the step of diffusing said lithium into said ZnO layer, whereby to prevent changes in the resistivity of said ZnO layer.

7. A method of making an optical waveguide as described in claim 1 comprising the additional steps of:
depositing electrodes on said passivating film, and
depositing a second film of aluminum oxide over said passivating film and said electrodes.

8. A method of making an optical waveguide as described in claim 1 wherein:
the step of depositing said layer of ZnO comprises heating a source of zinc oxide at a temperature of about 850°C in a $H_2$ ambient while maintaining said substrate on which said layer is to be deposited spaced from said source and at a temperature of between about 50°C to 100°C below that of said source.

9. A method of making an optical waveguide as described in claim 1 wherein:
said surface of said ZnO layer is polished until substantially no scratches are visible at a 1000X magnification.

10. A method of making an optical waveguide as described in claim 1 wherein:
the step of diffusing lithium into said ZnO layer comprises heating a source of lithium at a temperature of about 850°C, in an oxygen ambient, while maintaining said ZnO layer spaced from said source of lithium at a temperature of between about 600°C and 800°C.

11. An optical waveguide made by the method of claim 1.